J. W. WOOD.
PLOW.
No. 193,102. Patented July 17, 1877.
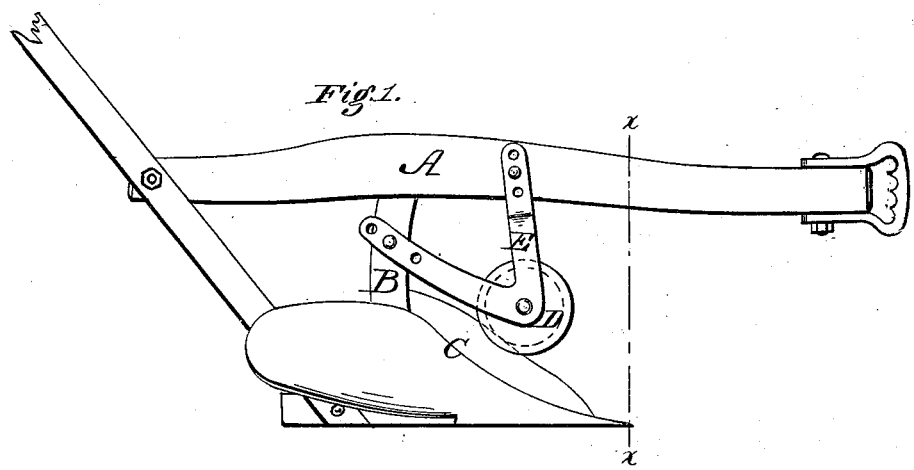
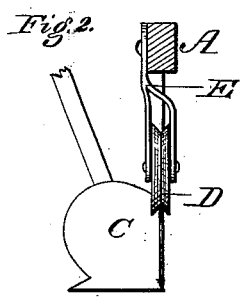
Witnesses:
Donn P. Twitchell
Will H. Dodge
Inventor:
J. W. Wood
By Dodge & Son
Attys

UNITED STATES PATENT OFFICE.

JOHN W. WOOD, OF BONHAM, TEXAS.

IMPROVEMENT IN PLOWS.

Specification forming part of Letters Patent No. 193,102, dated July 17, 1877; application filed May 1, 1877.

*To all whom it may concern:*

Be it known that I, JOHN W. WOOD, of Bonham, in the county of Fannin and State of Texas, have invented certain Improvements in Plows, of which the following is a specification:

The object of my invention is to produce a plow which will effect a clean severance of the sod on the land side when operating in heavy, tenacious soil, and which will prevent the accumulation of rubbish against the edge of the mold-board or standard; and to this end the invention consists in arranging a grooved wheel astride the colter, or on the cutting-edge of the mold-board, in such manner as to hold the sod down and assist in cutting the same, and prevent rubbish, &c., from riding upward.

I am aware that rotary disk-colters and rotary wheels have been made in a great variety of forms, and arranged in various position in advance of the mold-board; but, in practice, I have found that my grooved wheel answers far better, and accomplishes a result which cannot be attained by them.

Figure 1 represents a side elevation of my plow; Fig. 2, a front-end elevation of the same.

A represents the beam, B the standard, and C the mold-board, of an ordinary plow, constructed and arranged as usual; and D represents my wheel sustained by a bracket, E, in an upright position in advance of the mold-board, with its grooved edge astride of, and in close proximity to, the cutting-edge of the colter, or on the same, as shown, the cutting-edge in the drawing being formed by a colter attached to the edge of the mold-board. The wheel is arranged at such height as to run upon the sod when the plow is in action, and in order that it may be raised and lowered to correspond with the varying depths at which the plow may be caused to cut, the ends of the bracket-arms are provided with a series of holes, as shown, which allow their positions to be varied on the fastening-bolts, by which they are secured to the beam and the standard. The size of the wheel, the arrangement of the devices for sustaining the same, and the form of the groove may be varied, provided the wheel embraces the cutting-edge of the colter or mold-board; but the best results are attained when the sectional form of the groove closely approximates that of the cutting-edge of the mold-board.

When the plow is in action the grooved wheel, riding on the sod and overlapping the cutting-edge on both sides, holds the sod and keeps it down in direct contact with the cutting-edge, in such manner that a sharp clean severance is effected. The wheel also prevents stubble, grass, and other rubbish from riding upward on the edge of the mold-board and accumulating against the standard, as it would otherwise do. The wheel holding the rubbish down insures its being cut in two by the mold-board or being drawn off by the traction of the ground as the plow advances.

Having described my invention, what I claim is—

1. In combination with a mold-board plow, a grooved wheel, D, arranged to straddle or embrace the cutting-edge of the colter or mold-board, as shown.

2. In combination with the mold-board C, having the cutting-edge or colter, the grooved wheel D, sustained by the adjustable bracket E, as shown.

JOHN W. x WOOD.
his mark.

Witnesses:
 JOEL W. ELLIS,
 T. D. ACREA.